United States Patent [19]

Blades

[11] 4,272,679
[45] Jun. 9, 1981

[54] ULTRAVIOLET RADIATION SENSOR

[75] Inventor: Frederick K. Blades, Boulder, Colo.

[73] Assignee: PureCycle Corporation, Boulder, Colo.

[21] Appl. No.: 80,097

[22] Filed: Sep. 28, 1979

[51] Int. Cl.³ .......................... G01J 1/42; G01N 21/64
[52] U.S. Cl. .................................. 250/372; 250/461 B
[58] Field of Search ............... 250/372, 461 R, 461 B, 250/486, 483

[56] References Cited

U.S. PATENT DOCUMENTS

| | | | |
|---|---|---|---|
| 2,114,163 | 4/1938 | Bird | 250/372 |
| 2,349,754 | 5/1944 | Porter . | |
| 3,427,489 | 2/1969 | Walsh | 250/372 |
| 3,535,044 | 10/1970 | Seward . | |
| 3,629,587 | 12/1971 | Decupper . | |
| 3,838,282 | 9/1974 | Harris | 250/372 |
| 3,869,614 | 3/1975 | Munk | 250/483 |

Primary Examiner—Alfred E. Smith
Assistant Examiner—Janice A. Howell
Attorney, Agent, or Firm—Woodcock, Washburn, Kurtz, Mackiewicz & Norris

[57] ABSTRACT

A sensor for the measurement of UV radiation is disclosed which comprises a first layer of phosphor particles directly exposed to incident radiation, which absorb incident radiation and emit visible radiation, a filter for absorbing UV disposed after the phosphor layer and chosen to permit the visible light emitted by the phosphor to pass through, and a photosensor sensitive to the visible light emitted by the phosphors. By disposing the filter after the phosphors, solarization of the filter is substantially eliminated and the sensor remains accurate over long periods of time.

13 Claims, 3 Drawing Figures

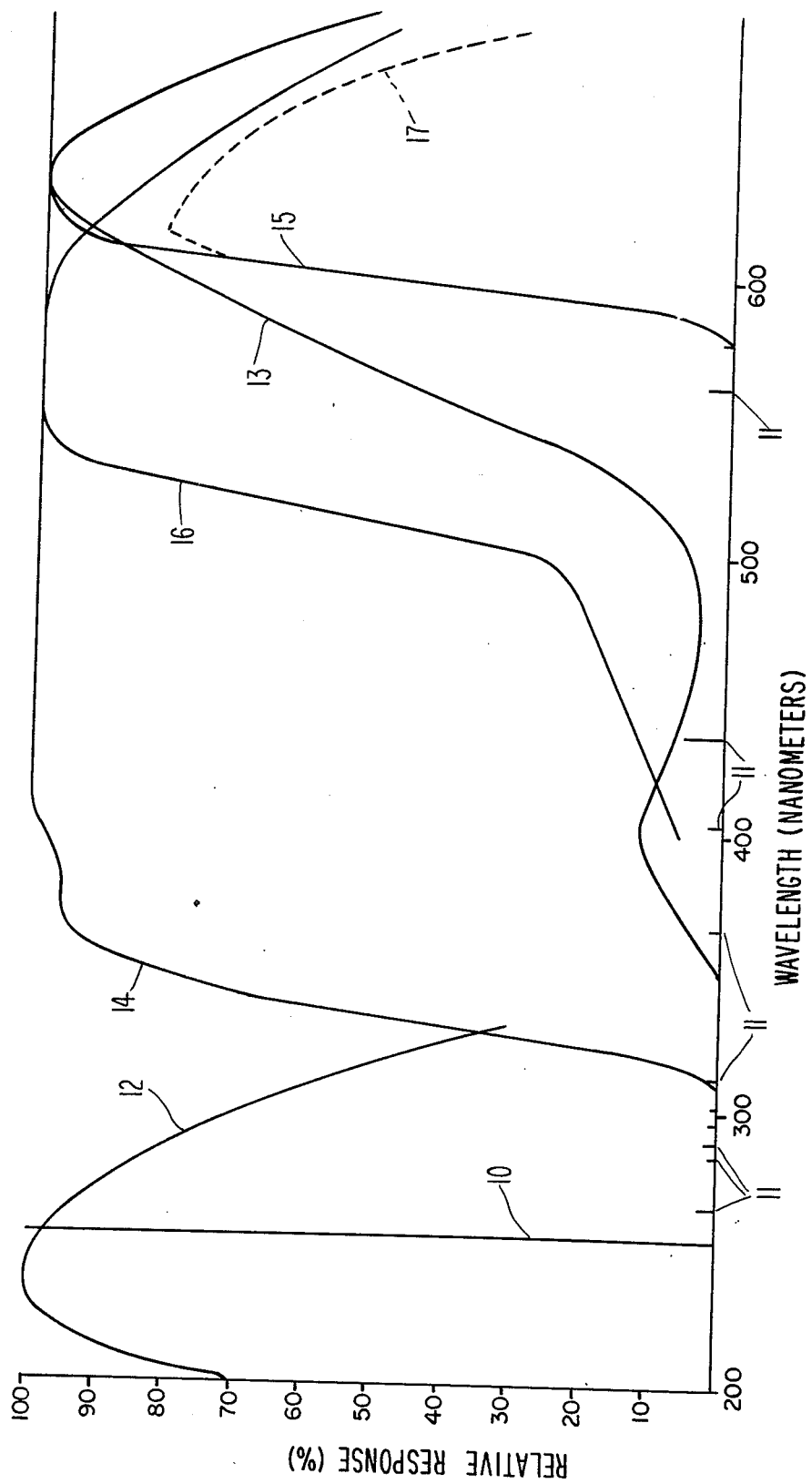

ULTRAVIOLET RADIATION SENSOR

BACKGROUND OF THE INVENTION

The present invention concerns detectors for measuring the bactericidal output from low pressure mercury vapor lamps.

Short wave Ultraviolet (UV) radiation having a wavelength in the range of 200-295 nanometers with a peak at about 270 nanometers is capable of destroying bacteria. Any fluid, such as air or water, when exposed to such radiation, is readily sterilized and disinfected without the need for heat or chemicals.

The low pressure variety of mercury vapor lamps, commonly known as germicidal lamps, produce a predominent spectral emission line at 253.7 nanometers and have therefore gained wide acceptance as an economical, efficient source of bacteriastat radiation. Though widely used in water sterilizers and the like, they suffer from several serious disadvantages; the intensity of the 253.7 nanometers emission varies with temperature, voltage, frequency of excitation and bulb life-time. It has therefore been found desirable to provide a means to accurately and continuously monitor the intensity of the 253.7 nanometer emission line and thus the bacteriological effectiveness of the low pressure mercury vapor lamps over long periods of time.

Several methods have been proposed to measure UV radiation over a narrow bandwidth, though most are subject to degradation with age by the incident UV radiation.

Generally, UV detectors consist of a filter or combination of filters to pass only the UV radiation of interest followed by means to convert such radiation into electrical signals. Although sensors do exist which are capable of converting short wave UV radiation directly into electrical signals, they are usually considered too expensive and cumbersome to employ. A more commonly used method employs modern solid state sensors with a phosphor converter screen which, when irradiated with short wave UV radiation, re-emits light with a longer wave length that lies within the detection range of the solid state sensor.

An example of this type of device is described in U.S. Pat. No. 2,349,754 issued to Thomas R. Porter on May 23, 1944. The Porter device utilizes a Corning black glass UV filter preceding the phosphor to filter out the unwanted radiation.

Another device described in U.S. Pat. No. 3,838,282 issued to Phillip B. Harris on Sept. 24, 1974, utilizes an interference filter prior to the phosphor.

Sensors of the type described above employing filters prior to the phosphor converter layer are subject to significant drift with age due to solarization of the filters and windows employed. Compensation for these errors or periodic re-calibration is thus generally required to maintain a reasonable degree of accuracy over long periods of time.

Another method commonly employed is to perform the measurements intermittently. U.S. Pat. No. 3,629,587 issued to Jean A. Decupper on Dec. 21, 1971, describes a shutter system positioned in front of the sensor and opened only when a measurement is to be made, thus shielding the sensor from prolonged UV exposure, and lengthening its useful life.

The methods proposed to date all seek to filter all unwanted frequencies prior to the detection means and thus are subject to the problems associated with such pre-filters.

Since U.V. radiation is harmful to living tissue, most systems employing germicidal lamps such as water sterilizers, use such lamps in a closed optical environment i.e. the emitted light is contained within the system. Thus, conversely, light is not allowed to enter the system, leaving the germicidal lamp as the sole source of radiation.

Low pressure mercury vapor lamps designed for germicidal applications have a well known emission spectrum. In addition to the predominant 253.7 nanometer spectral emission, emission lines extending into the visible region and some infrared frequencies are emitted.

OBJECTS OF THE INVENTION

It is the principal object of the present invention to provide a method to selectively detect in a closed optical environment the 253.7 nanometer emission line from a low pressure mercury vapor lamp without the use of filters prior to the phosphor converter layer.

It is a further object of the present invention to provide an apparatus for continuously and accurately monitoring the 253.7 nanometer emission line from one or more germicidal lamps in a closed optical environment over long periods of time.

Still a further object of the invention is to provide a detector for monitoring the emission of ultraviolet radiation from a germicidal lamp and providing a signal indicative of the amount of sterilization performed.

SUMMARY OF THE INVENTION

In accordance with the present invention, the entire emission spectrum from a mercury vapor source impinges directly onto a UV detector comprising a phosphor layer consisting of a plurality of small phosphor particles imbedded in a thin, UV-transparent matrix. The phosphor is selected to have a relatively narrow excitation spectrum including 253.7 nanometers and an emission spectrum in the visible red, preferably around 650 nanometers. A second layer of glass or a similar material of suitable thickness absorbs all of the remaining UV radiation below about 350 nanometers, thus protecting further layers from UV degradation and solarization, but freely passes both the phosphor-emitted red visible light and the remaining spectral emission of the bulb, consisting primarily of visible blue and infrared. A third layer consisting of a visible red filter passes only the visible red and infrared above about 575 nanometers, and finally a cadmium sulfide photocell highly responsive to the phosphor emitted visible red yet whose response falls off rapidly in the infrared, converts the remaining visible radiation into an electrical signal. Thus the combination selectively and efficiently responds to the 253.7 nanometer emission line from a low pressure mercury vapor source.

BRIEF DESCRIPTION OF THE DRAWINGS

FIG. 3 illustrates the relative response characteristics of the elements in the sensor of FIG. 1 superimposed on the relative output spectrum of a low pressure mercury vapor source.

DETAILED DESCRIPTION OF THE PREFERRED EMBODIMENT

Figure 1:
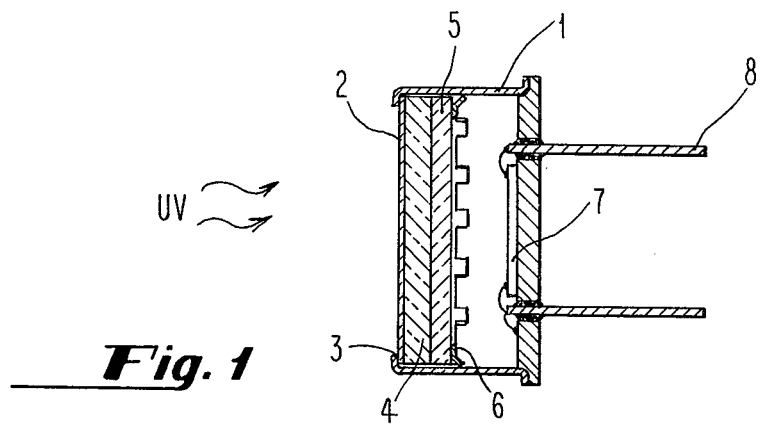
FIG. 1 is a cross-section of a sensor built in accordance with the present invention.

A preferred physical embodiment of the invention is illustrated in FIG. 1. The sensor assembly is encased in a standard photocell housing 1 preferably constructed of a metal, such as steel, to avoid degradation of the encasement from exposure to the UV radiation to be measured.

A circular phosphor converter layer 2 approximately 10 mils. thick is mounted in the assembly and environmentally protected with a sealing means 3 such as a suitable adhesive or washer.

Positioned directly behind the phosphor converter layer is a sheet of UV absorbing glass 4 approximately $\frac{1}{8}$" thick. An additional layer 5 consists of a visible filter positioned directly behind the glass layer and held in place by a circular retention ring 6.

The photocell 7 is physically mounted on the bottom of the assembly and wired to the electrical ouput wires 8 with standard photocell packaging techniques.

Figure 2:
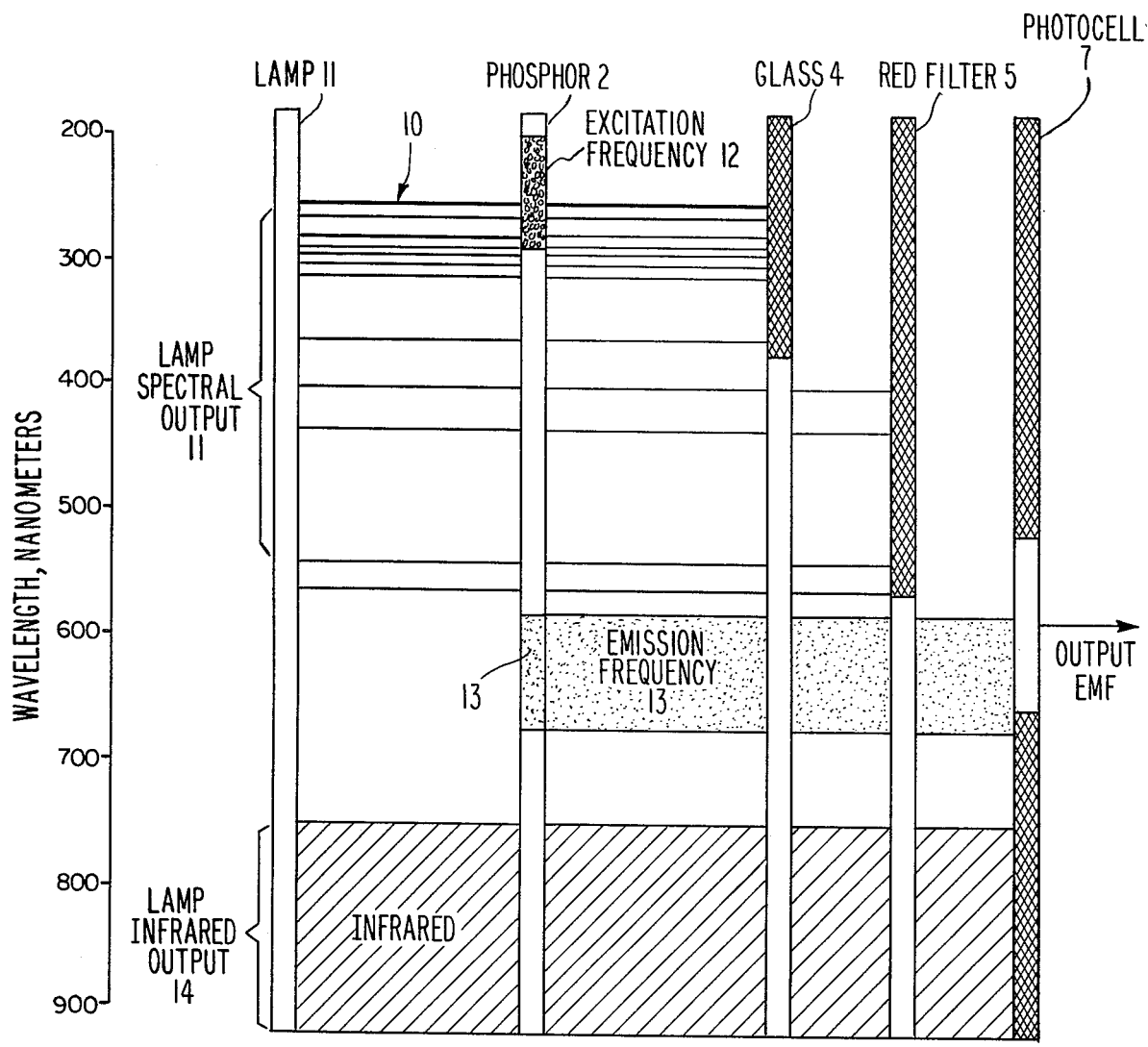
FIG. 2 is a simplified optical diagram to illustrate the operation of the sensor of FIG. 1.

Referring now to FIG. 2 and FIG. 3 the specific optical characteristics of the elements of the preferred embodiment are described.

Radiation from a low pressure mercury vapor source has a spectral output comprising the 253.7 nanometer emission line 10 and additional spectral emission frequencies. The relative magnitude of the remaining 11 frequencies is a function of the particular bulb construction and operating conditions. For a GE 36T6 "steri-lamp" bulb operating at 200 milliamperes, the relative intensities after 100 hours operation, as illustrated in FIG. 3, are:

| Wavelength (nm) | Intensity % |
|---|---|
| 253.7 | 100 |
| 265.2 | 3.05 |
| 280.4 | .1 |
| 289.4 | .14 |
| 296.7 | .52 |
| 302.2 | .25 |
| 312.9 | 1.96 |
| 365.4 | 1.67 |
| 404.7 | 1.98 |
| 435.9 | 6.00 |
| 561.1 | 3.27 |
| 578.0 | .71 |

Additional radiation 14 due to the heating of the arc lies in the infrared region above about 750 nanometers.

In accordance with the present invention, such radiation is emitted from the lamp and impinges upon the phosphor converter layer 2.

The phosphor converter layer 2 comprises a plurality of phosphor particles imbedded in a thin UV transparent layer. The phosphor is selected to have an exitation frequency 12 centered around 254 nanometers and an emission frequency 13 in the visible red. A phosphor that works well is composed of strontium, magnesium, orthophosphate and trace amounts of tin. It is known as high output white, manufactured by Westinghouse Electric Co., as product #902551. The relative exitation 12 and emission 13 frequency spectrums are illustrated in FIG. 3.

The phosphor holding matrix consists of a thin UV transparent material. Any such material may be implemented, such as a high grade quartz though solarization of this material will result in decreased accuracy. Therefore, it is desirable to mount the phosphor particles in a material such as fluorinated hydrocarbon, e.g. powdered Kel-F 6061, manufactured by 3-M Corporation, which shows little change in transmission in 300 hours of direct exposure to approximately 30,000 microwatts per centimeter$^2$ of primarily 254 nanometer UV radiation. Further the phosphor is readily mixed in the Kel-F before it is cured. The phosphor should be mixed in a layer of Kel-F approximately 10 mils. thick in such a manner that it is evenly dispersed and in such proportions to provide maximum efficiency.

With the phosphor converter layer constructed as described above, incident radiation within the excitation range of the phosphor will be partially absorbed and an emission spectrum 13 as shown in FIG. 3 will be generated in approximate proportion to the intensity of the incident 254 nanometer line.

Any UV radiation that is not absorbed by the phosphor layer passes through to the glass layer 4. The glass layer absorbs the remaining UV radiation to protect further elements from UV degradation and solarization. The glass, comprised of ordinary window glass approximately $\frac{1}{8}$ inch thick, has an approximate transmission curve 14 as shown in FIG. 3. Thus, radiation below about 350 nanometers (i.e. any unabsorbed UV radiation) is essentially absorbed by the glass layer. As this glass solarizes, it becomes gradually less transmissive to longer wave UV radiation. The specific composition of the glass should be chosen such that at maximum solarization, the transmission above 500 nanometers remains virtually unaffected.

Radiation passing through the glass layer 4, consisting of the remaining visible radiation from the lamp, the emission from the phosphor and the incident infrared, impinges upon visible filter layer 5. The response of the filter is selected to block all the remaining visible radiation from the bulb yet freely pass the phosphor emitted radiation. Thus, it should be a filter with a sharp cut off below about 575 nanometers; a Corning #2-63 sharp-cut red filter with a response characteristic 15 as shown in FIG. 3 works acceptably.

A visible interference filter may be substituted to sharpen the filter cut off if desired.

The incident visible light from the bulb is thus absorbed by the red filter layer 5 leaving only the phosphor emitted radiation and the incident infrared exposing the photocell 7. The photocell 7 is selected to be responsive to the phosphor emission yet fall off rapidly in the infrared. A cadmium sulfide cell of so-called type 9 material, manufactured by Clairex Inc., exhibits such response characteristics. The relative response curve 16 is shown in FIG. 3. Type 9 material exhibits both high linearity and good temperature stability and is widely used in optical measurements. A cell of this type is a variable resistance device and its output is best measured as a current.

Thus, the combination of visible elements described above produces a visible cumulative response 17 as illustrated in FIG. 3. This taken in conjunction with the known incident radiation spectrum from the source, provides an output current essentially proportional to the incident 254 nanometer line yet unresponsive to the remaining radiation emitted from a low pressure mercury vapor lamp. Since the bactericidal effect of the light is proportional to the amount of 254 nm UV present therein, the output current is proportional to the bactericidal efficacy of the light source.

I claim:

1. A UV radiation sensor for measurement of incident UV radiation comprising:
   a first layer of UV absorptive material arranged to be exposed directly to said incident radiation comprising a plurality of phosphor particles which, in response to the incident UV, emit visible or near visible radiation; followed by
   filter means for absorbing substantially all UV radiation not absorbed by said phosphor and transmitting said visible or near visible radiation; and
   means for providing an electrical signal in response to said visible or near visible radiation;
   whereby solarization of said filter means is avoided.

2. A UV radiation sensor for measuring the UV component of incident radiation comprising:
   a first layer comprising a phosphor material chosen to absorb UV and emit visible or near visible radiation in response to absorbed UV; followed by
   a second layer comprising a filter for absorbing any UV and visible incident radiation passing through said first layer and for freely passing said visible or near visible radiation emitted by said phosphor; followed by
   means for providing an electrical signal in response to said emitted visible or near visible radiation.

3. An Ultraviolet radiation sensor for measuring the UV component of incident radiation comprising a first layer of UV transmissive material having a plurality of phosphor particles imbedded therein which, in response to the incident UV, emit visible or near visible radiation, said layer passing any visible component of said incident radiation; followed by
   a second layer comprising a filter for absorbing any UV radiation passing through said first layer and for freely passing said visible or near visible radiation; followed by
   a third layer comprising a filter or combination of filters for selectively passing said emitted visible or near visible radiation; and for absorbing said visible component of said incident radiation; followed by
   means for providing an electrical signal in response to said emitted visible or near visible radiation.

4. A sensor according to claim 3 wherein said second layer and said third layer are combined as a single element.

5. A sensor as claimed in any of claims 1, 2, 3 or 4 wherein said first layer comprises a fluorinated hydrocarbon sheet having phosphor particles embedded therein.

6. A sensor for selectively monitoring the 253.7 nanometer emission line radiation from a low pressure mercury vapor source in a low ambient light environment, comprising:
   a first layer of UV transmissive material having imbedded therein a plurality of phosphor particles whose excitation frequency includes 253.7 nanometers and whose emission frequency is in the visible region above about 550 nanometers; followed by
   a second layer comprising a filter which absorbs any UV radiation having passed through said first layer having a wavelength below about 400 nanometers and which freely passes visible radiation of a wavelength above about 575 nanometers; followed by
   a third layer comprising a filter or combination of filters for filtering radiations of wavelengths less than about 575 nanometers; followed by
   means for providing an electrical signal in response to said visible radiation.

7. A sensor according to claim 6 wherein said second layer and said third layer are combined as a single element.

8. A sensor according to claim 6 wherein said means for providing an electrical signal is a cadmium sulfide photocell producing substantially zero output to response to infrared incident light.

9. A sensor for measuring bactericidal efficiency of ultraviolet light comprising:
   a first layer of UV transmissive material having imbedded therein a plurality of phosphor particles adapted to emit visible radiation in proportion to incident ultraviolet radiation; followed by
   a second layer comprising a filter for absorbing ultraviolet radiation; followed by
   a third layer comprising means for absorbing a preselected fraction of visible radiation; followed by
   means for providing an electrical signal proportional to the remainder of said visible radiation.

10. A sensor according to claim 9 wherein said second layer and said third layer are combined as a single element.

11. A sensor according to claim 9 wherein said layer of ultraviolet transmissive material is a fluorinated hydrocarbon sheet.

12. A sensor according to claim 9 wherein said means for providing an electrical signal is a cadmium sulfide photocell producing substantially zero output in response to infrared incident light.

13. A transducer for converting incident ultraviolet radiation to a lower frequency radiation comprising a fluorinated hydrocarbon sheet having imbedded therein a plurality of phosphor particles.

* * * * *